Figure 1:
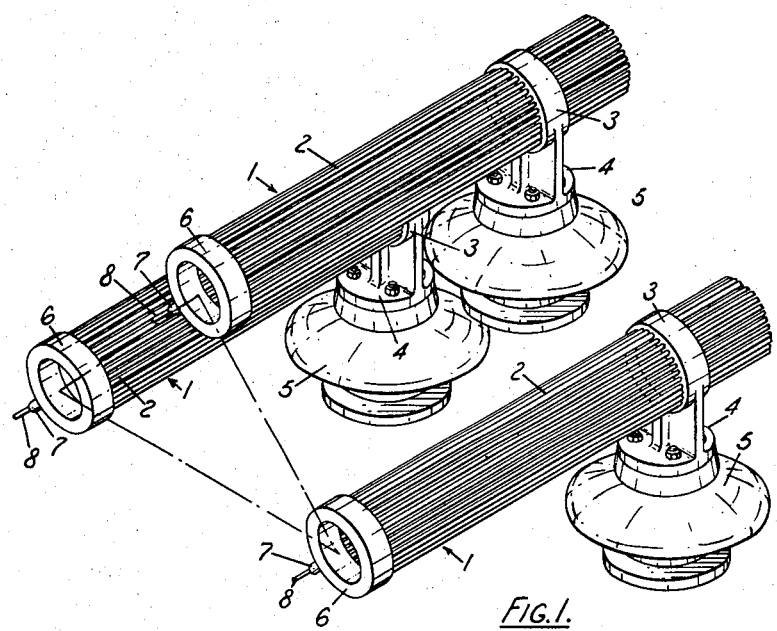

Aug. 25, 1964     P. McKENNA     3,146,359
TRANSPOSED ELECTRIC BUS BAR SYSTEMS FOR
HEAVY ALTERNATING CURRENTS
Filed Dec. 12, 1961     3 Sheets-Sheet 1

Inventor
Peter McKenna
By
Webb Mackey + Burden
Attorney

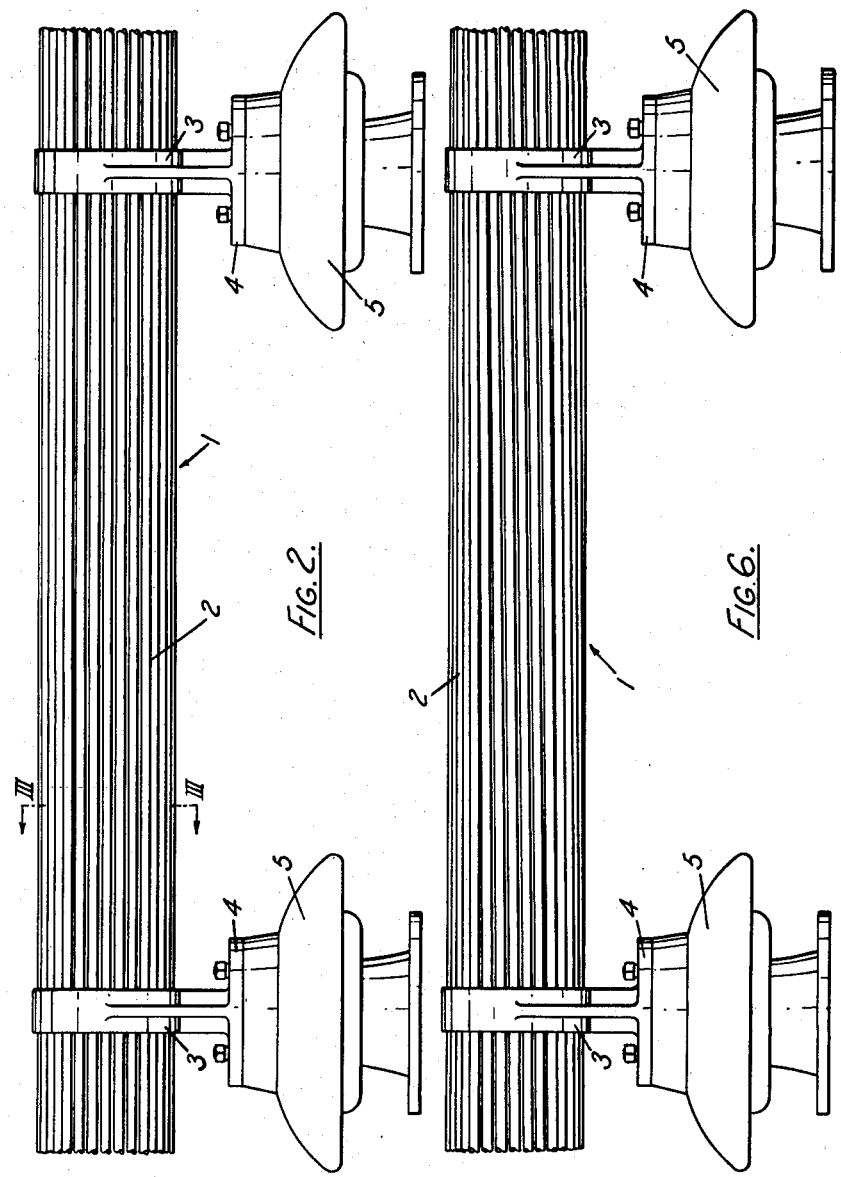

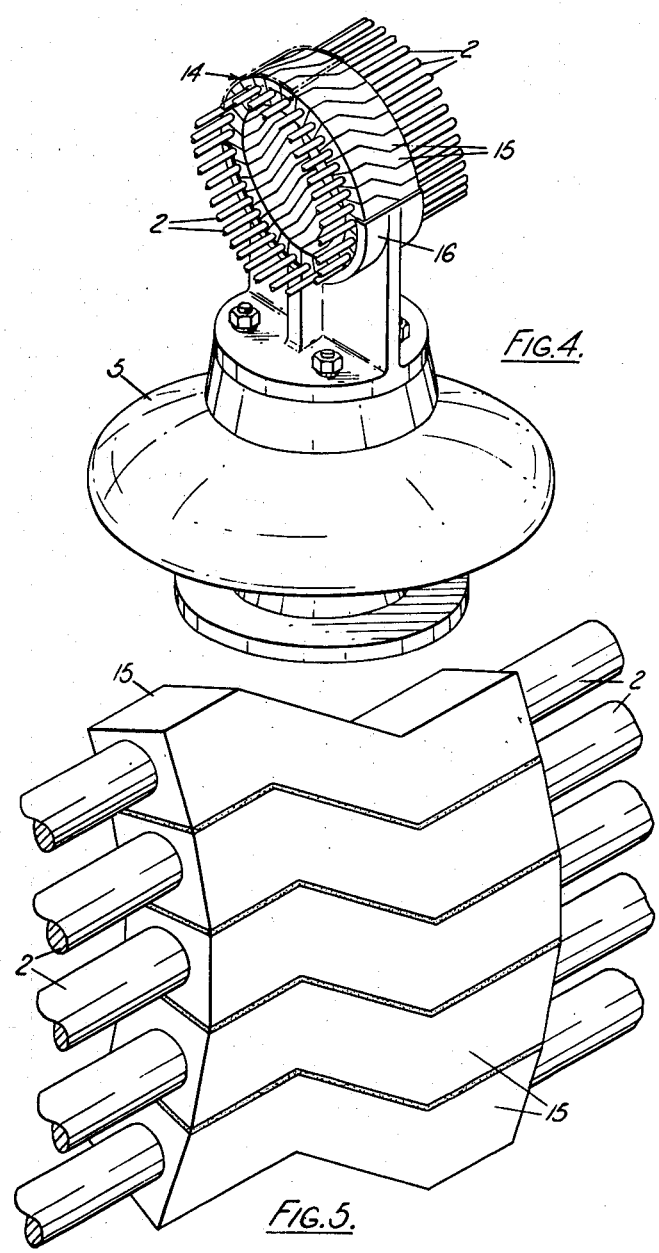

United States Patent Office 3,146,359
Patented Aug. 25, 1964

3,146,359
TRANSPOSED ELECTRIC BUS BAR SYSTEMS FOR HEAVY ALTERNATING CURRENTS
Peter McKenna, Bromley, Kent, England, assignor to British Insulated Callender's Cables Limited, London, England, a British company
Filed Dec. 12, 1961, Ser. No. 158,705
Claims priority, application Great Britain Dec. 16, 1960
2 Claims. (Cl. 307—147)

This invention relates to transposed electric bus bar systems for heavy alternating currents and by heavy currents we mean currents of several thousands of amperes. For the transmission of currents of this magnitude by such systems it is now the practice to use two or more bus bars, e.g. one for each phase, of copper or aluminum, each bus bar being in the form of a tube of circular or rectangular cross-section, in the form of flat metal strips mounted side by side in spaced relationship or to form an approximation to a square tube, or in the form of a numerically small group of tubular channel or angle section members arranged to form an approximation to a rectangular tube. With increasing tendency towards transmission of heavier and heavier currents these forms of bus bar systems become less and less economic. If one endeavors not to exceed a given temperature rise, the mass of bus bar metal per unit length of the system becomes excessive; if one endeavors to keep down the mass of bus bar metal and operate at high temperatures, losses become unduly heavy and thermal damage to the bus bar may result.

By the present invention we provide an improved electric bus bar system for transmission of heavy currents which comprises at least two mutually spaced groups of conductors, each group consisting of a plurality of mutually spaced rods of circular cross-section, and means connecting each conductor of each group electrically in parallel with the neighbouring conductor or conductors of the same group.

By two mutually spaced groups of conductors we mean that all the conductors of one group lie to one side of a plane and all the conductors of the other group lie to the opposite side of that plane. Where there are more than two groups, as for example in a bus bar system for 3-phase A.C. transmission, the groups may be disposed in flat formation, that is with their axes lying in a common plane, or in triangular formation with their axes at the corners of a triangular prism.

In the case of a bus bar system for transmission of heavy alternating currents we prefer to dispose the conductors of each group symmetrically about a central axis to form a cage of circular or elliptical or polygonal cross-section in order to obtain an even distribution of current between the conductors but in certain cases it may be an advantage to dispose the conductors to form a cage having a cross-sectional shape of some other non-re-entrant configuration to still further reduce the proximity effect due to the conductors of one group lying in the electric field due to out of phase current flowing in those of a neighbouring group. For example in the case of a 3-phase system comprising three groups arranged in flat formation, the conductors of the central group may form a cage of circular cross-section and those of each outer group a cage of sector shaped cross-section with the "point" of the sector nearest the central group.

In the case of a bus bar system for the transmission of heavy direct currents the conductors of each group may be arranged in circular or other closed ring formation as above described or in horizontal, inclined or vertical flat formation or be arranged to form a number of flat sub-groups which may be horizontally, or vertically disposed or some of which may be disposed horizontally and some vertically.

The conductors themselves are preferably solid rods of high conductivity copper or of aluminium or a high conductivity alloy of aluminium.

The number and spacing of the conductors in a group will depend upon the magnitude of the current to be transmitted, the metal of the conductors, the permissible rise in conductor temperature and, in the case of alternating current systems, upon the depth of penetration of current of the particular frequency to be transmitted. Naturally the higher the number of individual conductors the greater the aggregate external surface of conductive material and the greater the thermal dissipation and the less the skin effect. In general for A.C. work the depth of current penetration will dictate the maximum diameter of the individual conductors and hence the minimum number of conductors in the group. The spacing between neighbouring conductors will depend upon the form of the group but for a circular group the optimum centre-to-centre spacing of the conductors, from the point of view of obtaining a group of which the diameter is as small as is consistent with reasonably good heat dissipation, is in the region of $1\frac{1}{2} \times d$, where $d$ is the conductor diameter. Where maximum heat dissipation is of primary importance a centre-to-centre spacing of from $2 \times d$ to $2\frac{1}{2} \times d$ is desirable.

The conductors in each group of our novel heavy current bus bar system may be supported at intervals by being threaded through an appropriate display of circular holes in a support lying with its axis coincident with that of the group and supported by an insulator mounted beneath or to one side or in some cases above the group. In cases where the conductors of each group are disposed symmetrically about a central axis to form a cage of non-re-entrant cross-section the support is preferably in the form of an annular plate or hollow cylinder.

Where the bus bar system is intended for transmission of alternating current and is of sufficient length, the conductors may be arranged to run in a helical direction about the axis of the group. This may readily be done by threading each support on to the conductors of a group at a small angle to its final position, then twisting it about the axis of the group through that angle to bring it to its final position on its supporting insulator. Alternatively the conductors may run parallel to the axis of the group between supports and a transposition be effected at each of some or all of the supports. To this end we may use a novel form of conductor support consisting of a ring of mutually insulated segments of copper, if the conductors are of copper, or of aluminium if the conductors are of aluminium. Each segment comprises a front portion having in its front face a recess to receive the end of a conductor, and a rear portion circumferentially displaced relative to the front portion by the circumferential pitch of the conductors of the group and having a recess in the opposite face of the segment to receive the end of a conductor. As seen from their radially outer faces each segment appears to approximate to a pair of substantially rectangular prisms that are relatively longitudinally staggered and united at their overlapping surfaces. This ring of segments may be housed in a two-part supporting ring of channel-shaped cross-section, the lower half of which may be integral with a pedestal for attachment to a supporting insulator.

Figure 3:
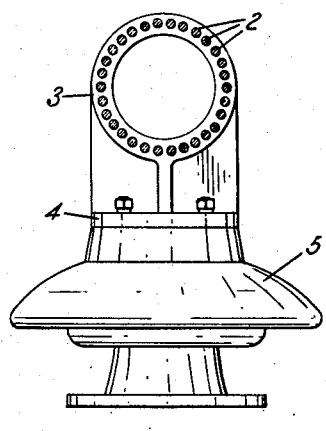

The invention will now be described in more detail, and by way of example, with reference to the accompanying drawings, in which:

FIGURE 1 is a fragmental diagrammatic perspective view of a heavy current bus bar system, FIGURE 2 is a side elevation of one group of conductors in the system, FIGURE 3 is a section taken on the line III—III in FIGURE 2, FIGURE 4 is a perspective view of a support for effecting transposition of the conductors of a group, FIGURE 5 is a fragmental perspective view of the support shown in FIGURE 4 drawn on a greater scale, and FIGURE 6 is a side elevation illustrating an alternative method of effecting transposition of the conductors of a group.

The bus bar system illustrated in FIGURES 1 to 3 is designed to carry an alternating current of 10,000 amps. at a frequency of 50 cycles/second with a temperature rise of 50° C. above the ambient temperature of 35° C. The system consists of three mutually spaced groups 1 of conductors, each group being a cylindrical cage of circular form, and the groups are so disposed that the axis of one of the groups lies at each corner of a triangular prism. Each cylindrical cage of conductors is built up of thirty copper rods 2, each rod being of circular cross-section and having a diameter of ½" so that the aggregate cross-sectional area of the group is approximately 6 sq. ins. The overall diameter of the cylindrical cage is 8". The rods 2 of each group 1 are supported at regular intervals of 4' by threading the rods through a ring of holes in an annular support plate 3 having feet 4 for securing it to the upper end of a porcelain insulator 5. At each end of each group all the rods 2 are electrically connected together by housing their ends in a massive copper ring 6 provided with a terminal 7 for connection to a flexible cable 8 connecting the system with the apparatus to or from which heavy currents are to be transmitted.

In one method of effecting transposition of the conductors of a group the conductors may run parallel to the axis of the group between supports and a transposition of the conductors may be effected at each of some or all of the supports. The support illustrated in FIGURES 4 and 5 is designed to effect transposition in this way and consists of a ring 14 of mutually insulated segments 15 of copper, housed in a two-part supporting ring 16 of channel-shaped cross-section which is supported by a porcelain insulator 5. Each segment 15 comprises a front portion having in its front face a recess to receive the end of a conductor 2 and a rear portion circumferentially displaced relative to the front portion by the circumferential pitch of the conductors of the group and having a recess in the opposite face of the segment to receive the end of an adjoining conductor.

In the alternative method of effecting transposition, shown in FIGURE 6, the conductors 2 of each group 1 are arranged to run in a helical direction about the axis of the group. This can readily be done by threading each support 3 on to the conductors 2 of a group at a small angle to its final position, then twisting it about the axis of the group through that angle to bring it on to its final position on its supporting insulator 5.

Except where our improved bus bar system is of very short length it will generally be necessary to build it up of numbers of rods placed end to end and electrically connected together. These connections may be scarf joints in which the scarfed ends of the two rods are sweated, bound or riveted together or they may be compression joints made by compressing a malleable metal sleeve over the abutting ends of the two rods or they may be made with the aid of a flexible braided sleeve secured on the ends of the rods by worm drive clips or by soldering or they may be joints made by simply overlapping the ends of the two rods and binding them together. Alternatively the joints may be made by housing the abutting ends of each pair of rods to be connected in the opposite end faces of an annular metal ring. The annular ring may be mounted on a porcelain insulator and may form one of the supports of the system. Where the system is of considerable length it will generally be necessary to provide in each component conductor of the system an expansion joint. This may be done by providing a gap between the ends of two successive lengths of rod and connecting them together electrically by a flexible braided joint.

What I claim as my invention is:

1. For transmission of heavy alternating currents, a bus bar system comprising at least two mutually spaced groups of conductors, each group being built up of a plurality of sections arranged end-to-end, each section comprising a plurality of mutually spaced rods of circular cross-section disposed symmetrically about and parallel to the central axis of the group to form the circumferential wall of a cage of non-re-entrant cross-section whose bars have a constant circumferential pitch, a plurality of supporting insulators spaced at intervals along the length of each group, a plurality of transposition supports each located between two neighboring sections of a group and each carried by one of said supporting insulators, each transposition support consisting of a ring of mutually insulated segments of electrically conductive metal, each segment having a front face and a recess in said face housing the adjacent end of one rod of one of the two neighboring sections of the group and having a rear face and in said rear face a recess circumferentially displaced from the recess in the front face and housing the adjacent end of one rod of the other of the two neighboring sections of the group, and means connecting each rod of each group electrically in parallel with the remaining rods of the same group.

2. For transmission of heavy alternating currents, a bus bar system comprising at least two mutually spaced groups of conductors, each group being built up of a plurality of sections arranged end-to-end, each section comprising a plurality of mutually spaced rods of circular cross-section disposed symmetrically about and parallel to the central axis of the group to form the circumferential wall of a cage of non-re-entrant cross-section whose bars have a constant circumferential pitch, a plurality of supporting insulators spaced at intervals along the length of each group, a plurality of transposition supports each located between two neighboring sections of a group and each carried by one of said supporting insulators, each transposition support consisting of a ring of mutually insulated segments of electrically conductive metal, each segment comprising a front portion having in its front face a recess housing the adjacent end of one rod of one of the two neighboring sections of the group, and a rear portion circumferentially displaced relative to the front portion having in its rear face a recess which is displaced relative to the recess in the front portion by the circumferential pitch of the rods and houses the adjacent end of one rod of the other of the two neighboring sections of the group, and means connecting each rod of each group electrically in parallel with the remaining rods of the same group.

References Cited in the file of this patent

UNITED STATES PATENTS

| 392,775 | Barrett | Nov. 13, 1888 |
| 680,150 | Hultman | Aug. 6, 1901 |
| 1,078,711 | Whitehead | Nov. 18, 1913 |
| 2,953,624 | Perrone et al. | Sept. 20, 1960 |

FOREIGN PATENTS

| 53,420 | Norway | Jan. 8, 1934 |
| 974,975 | Germany | June 22, 1961 |
| 1,162,698 | France | Apr. 14, 1958 |